March 2, 1948.  R. E. SUTHERLAND  2,436,944
ISOMERIZATION OF SATURATED HYDROCARBONS
Filed March 31, 1945
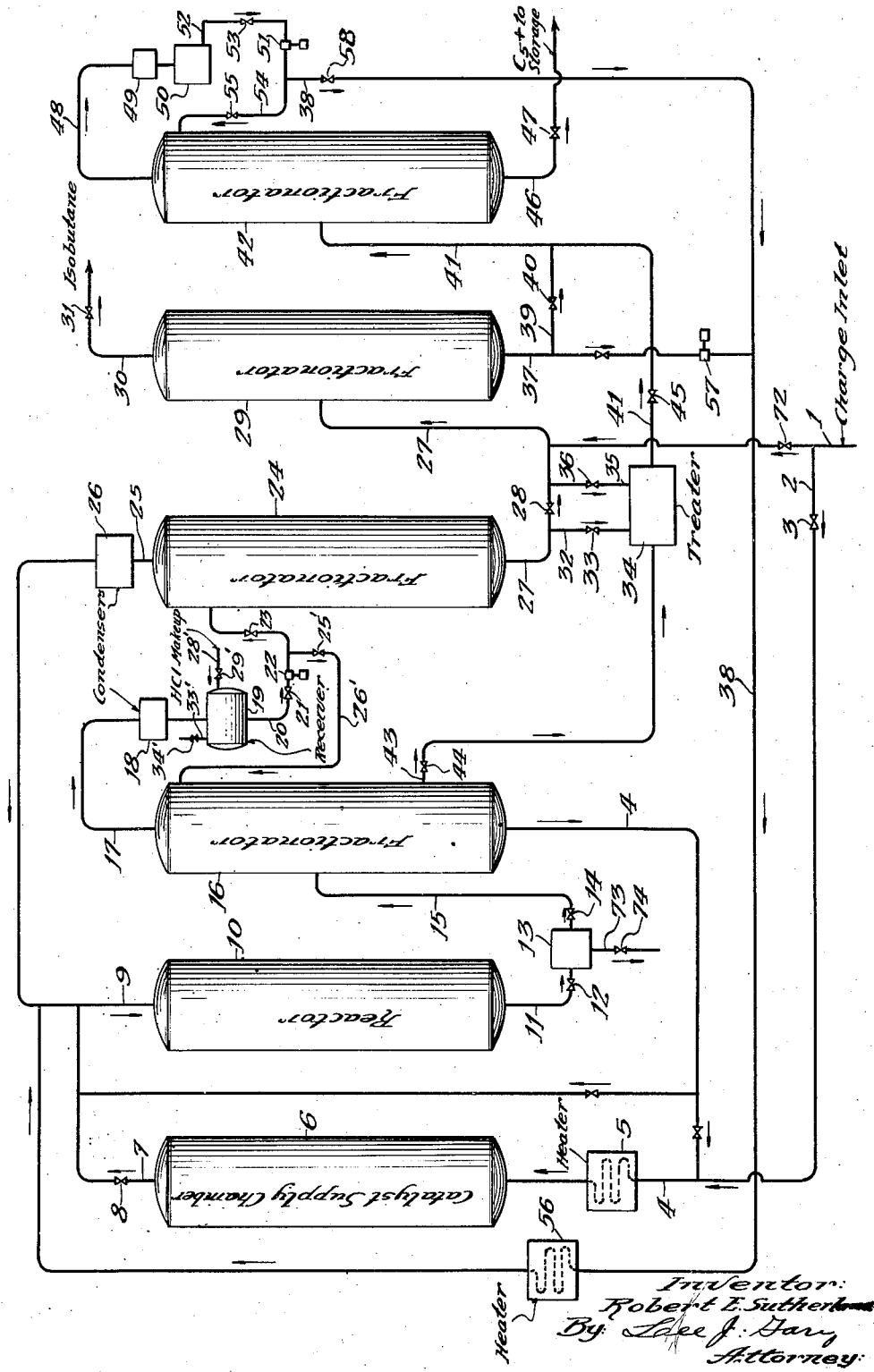
Inventor:
Robert E. Sutherland
By: Lee J. Gary
Attorney Patented Mar. 2, 1948

2,436,944

UNITED STATES PATENT OFFICE 2,436,944

ISOMERIZATION OF SATURATED HYDROCARBONS

Robert E. Sutherland, Chicago, Ill., assignor to Universal Oil Products Company, Chicago, Ill., a corporation of Delaware Application March 31, 1945, Serial No. 585,995

10 Claims. (Cl. 260—683.5)

This invention relates to the catalytic conversion of straight chain or mildly branched saturated hydrocarbons to more highly branched saturated hydrocarbons.

The invention is more particularly concerned with conducting isomerization processes employing metal halide catalysts of the Friedel-Crafts type in a particular mode of continuous operation which insures production of high yields of isomerized products per unit weight of metal halide catalyst.

The isomerization of saturated hydrocarbons has assumed great importance in recent years. For example, the isomerization of normal butane to the more reactive isobutane is conducted commercially on an extended scale. The isobutane is alkylated with olefins, such as propylene, butylenes and amylenes, to produce branched chained hydrocarbons of high antiknock value that are particularly useful in aviation gasoline blends. The isomerization of paraffinic hydrocarbons, such as pentane, hexane, heptanes, etc., which boil within the gasoline range, to compounds having more desirable antiknock properties is also being practiced. These isomerization reactions generally are carried out in the presence of catalysts of the Friedel-Crafts type, such as aluminum halides, zinc halides, zirconium halides, or mixtures thereof in the presence of hydrogen halide.

One of the important commercial continuous isomerization processes involves the passage of the hydrocarbons to be isomerized through beds of granular aluminum chloride in substantially liquid phase and the further passage of the effluent therefrom containing aluminum chloride dissolved therein into a reaction zone along with hydrogen chloride. The reaction zone is filled with a packing material, such as Raschig rings, crushed fire brick, pumice, quartz, silica-alumina composites, and similar packing material which serve to maintain a definite amount of active metal halide on the surface of the packing. The reaction products are separated from the aluminum chloride-hydrocarbon complex formed in the reaction zone and are then introduced into a fractionating zone wherein an overhead product containing substantially all of the hydrogen chloride and a large proportion of the isomerized hydrocarbon is separated from a liquid bottoms product containing unconverted and higher boiling hydrocarbons and having dissolved therein a major portion of the aluminum chloride catalyst entering said fractionating zone. A portion of the bottoms product from this fractionator is recycled to the reaction zone to utilize more fully the unused catalyst and to isomerize a portion of the unconverted charge. Small amounts, i. e., 1-4%, of higher boiling hydrocarbons are nearly always present in the charge to commercial isomerization units. In addition, a small but definite amount of hydrocarbons with boiling points above that of the charge are formed in the reaction. These higher boiling materials accumulate in the bottoms product of the fractionator and are recycled to the reactor. In order to prevent a buildup of these materials in the system, a portion of the bottoms from the fractionator is directed to a treater wherein the dissolved aluminum chloride is removed by caustic washing, cooling and deposition, or any other well-known method prior to fractionation of this stream. The necessity of withdrawing these higher boiling materials containing dissolved aluminum chloride from the system contributes greatly to the consumption of catalyst and the cost of the process.

By the use of my invention this consumption of catalyst and the concomitant cost of the process are greatly reduced.

I have found that the concentration of aluminum chloride in a vapor phase in equilibrium with a liquid hydrocarbon containing dissolved aluminum chloride is much less than the concentration of aluminum chloride in the liquid. I have applied this discovery to the process described above and have thereby greatly decreased the amount of catalyst consumed per barrel of isobutane produced. By drawing off the necessary amount of higher boiling hydrocarbons in vapor form from a vapor space in the lower portion of said fractionator, I have been able to maintain the concentration of high boiling hydrocarbons in the system at any desired value and have effected a marked savings in catalyst consumption. This method of operation is accompanied by a reduction in the amount of caustic needed to neutralize the aluminum chloride in the withdrawal stream from the fractionator. Also, the use of my invention permits the inclusion of larger amounts of high boiling hydrocarbons in the charge stock before a prohibitive consumption of catalyst is reached. This in turn lessens the need for precise and expensive fractionation of the charge. Still another benefit arises from the fact that smaller quantities of alkyl chlorides are withdrawn from the process when vapor phase withdrawal is practiced. These alkyl chlorides are relatively high boiling and tend to accumulate in the liquid bottoms product of the aluminum chloride column. Recycle of this material to the reaction zone tends to suppress the formation of more alkyl chlorides. By withdrawing the higher boiling hydrocarbons as vapors from a vapor space in the aluminum chloride column there is a net decrease in the amount of alkyl chlorides removed from the system and hence a further saving of catalyst. The economic significance of these advantages will be illustrated in the example that is given later in the specification.

In one specific embodiment the present invention consists of an improvement in the catalytic isomerization of saturated hydrocarbons wherein the hydrocarbon is subjected to the action of a metal halide isomerizing catalyst in the presence of a hydrogen halide under isomerizing conditions and wherein sludge formed in the reaction is separated from the remaining reaction products, said improvement comprising introducing said remaining reaction products to a fractional distillation zone and therein fractionally distilling said products to separate an overhead product containing isomerized hydrocarbons formed in the reaction and the hydrogen halide from a liquid bottoms product containing dissolved metal halide, returning at least a portion of said bottoms product to the isomerization step, and withdrawing from the fractional distillation zone at a point below that at which said remaining products are introduced, a vapor stream of hydrocarbons lower in metal halide concentration than the liquid in equilibrium therewith, and recovering said vapor stream.

Further advantages of the disclosed invention will be evident from the following detailed description of the attached diagrammatic sketch, which illustrates in conventional side elevation one type of apparatus in which the objects of the invention may be accomplished.

To simplify the explanation of the drawing it shall be considered in connection with the isomerization of normal butane using aluminum chloride promoted by hydrogen chloride as the isomerization catalyst. It is not intended, however, that this simplification should unduly limit the generally broad scope of the invention since the apparatus herein described is suitable for the isomerization not only of butane but also of other saturated isomerizable hydrocarbons, such as methylcyclopentane and dimethylcyclopentane.

Referring to the drawing, a normal butane charge is introduced through line 1 and if it contains a substantial amount of isobutane it is directed through valve 72 into line 27 through which it passes to fractionator 29 wherein the isobutane is separated therefrom and the normal butane is charged to the reactor in a manner hereinafter described. If the charge is composed essentially of normal butane, it is introduced through line 2 containing valve 3 and into line 4 and heater 5 wherein it is heated to the desired temperature and then passed into aluminum chloride supply tower 6. The aluminum chloride tower 6 is maintained at a temperature within the range of about 50–250° F. and preferably within the range of 150–200° F. under a pressure sufficient to maintain the normal butane in substantially liquid phase during its passage through this tower. Although only one catalyst supply tower is shown on the drawing, two or more towers connected in series or parallel may be used. When the catalyst supply in any tower becomes depleted the tower may be bypassed while it is being cleaned and refilled and put back into operation without disrupting the continuity of the process. The flow of hydrocarbon through the catalyst supply towers may be either in an upward or downward direction.

The normal butane stream leaving tower 6 containing aluminum chloride dissolved therein is directed through line 7 containing valve 8, commingled with various recycle streams, including a stream of hydrogen chloride obtained as hereinafter described, and the resulting mixture is directed through line 9 into reactor 10 wherein a substantial portion of the normal butane is converted to isobutane. The temperature within reactor 10 will be partially dependent upon the hydrogen chloride concentration in the reactor but will ordinarily be within the range of about 50 to about 350° F. and preferably between about 150 to about 250° F. The pressures may be varied from about slightly superatmospheric to pressures of the order of 125 to 550 pounds per square inch gage. The hydrogen chloride concentration within reactor 10 may be varied from about 1 to about 40 mol per cent, depending upon the temperature used but will ordinarily be within the range of about 5 to about 20 mol per cent. The reaction may be conducted in either the liquid, vapor, or mixed phases. A space velocity in the reactor measured as volumes of liquid charge per volume of packed space may be varied between about 0.01 to about 5, but is preferably between about 0.1 to about 0.75.

Reactor 10 may comprise a large cylindrical chamber filled with solid packing materials, such as Raschig rings, crushed fire brick, alumina, quartz, pumice, silica-alumina composites, or any of the ordinary refractory packing materials known to those skilled in the art.

The reaction products leave reactor 10 through line 11 containing valve 12 and are directed into chamber 13 wherein heavy sludge-like materials consisting of aluminum chloride-hydrocarbon complexes are removed therefrom. Sludge separation chamber 13 may be incorporated in reaction vessel 10 if so desired. Sludge withdrawn from chamber 13 through line 73 containing valve 74 is recovered as a product of the reaction. This sludge may be contacted with the various recycle streams to dissolve out hydrogen chloride or free aluminum chloride which may then be recycled to the process in said streams. The sludge may also be contacted with the fresh feed to dissolve out hydrogen chloride or free aluminum chloride or to remove olefins from the feed.

The sludge-free reaction products containing free aluminum chloride therein are withdrawn from chamber 13 through line 15 containing valve 14 and are directed into fractionator 16. The reaction products entering fractionator 16 may be either in the liquid, mixed, or vapor phases depending upon the particular conditions of temperature and pressure used in reactor 10. Separation in fractionator 16 produces an overhead fraction containing substantially all of the hydrogen chloride and isobutane and some of the unconverted normal butane charge and a bottoms fraction substantially free of hydrogen chloride and containing higher boiling hydrocarbons, the remainder of the unconverted normal butane, and most of the aluminum chloride introduced through line 15. The overhead fraction is directed through line 17 into condenser 18 and the condensed product is accumulated in receiver 19.

Pump 22 takes suction from receiver 19 through line 20 containing valve 21 and discharges through valve 23 into fractionator 24 wherein an overhead fraction is obtained containing substantially all of the hydrogen chloride. A portion of the liquid condensate in receiver 19 is recycled to fractionator 16 as reflux to increase the degree of separation. Small amounts of light gases, such as ethane and propane formed during the isomerization reaction, may be withdrawn from the system through line 33' containing valve 34' to prevent a buildup of these materials in the system. Small amounts of hydrogen chloride withdrawn along with these gases may be recovered and recycled. Makeup hydrogen chloride may be added to receiver 19 through line 28' containing valve 29'. The overhead product from fractionator 24 is directed through line 25 through condenser 26 and into line 9 and reactor 10. Column 24 may be refluxed in the usual manner to increase the degree of fractionation.

Column 24 will be operated under a pressure substantially in excess than the pressures used in reactor 10 and fractionator 16. Higher temperatures may be used safely and with advantage during the fractionation in column 24 because substantially no aluminum chloride will be present in the bottoms to react with the hydrocarbons to form sludge. This high pressure operation not only increases the degree of separation of the hydrogen chloride from the hydrocarbons, but also permits the return of the hydrogen chloride to the reactor without the need for a compressor for increasing the pressure of the returning stream.

The bottoms from column 24 comprising essentially isobutane and unconverted normal butane are directed through line 27 containing valve 28 into fractionator 29 wherein the isobutane is separated from the unconverted normal butane. As an alternative, the bottoms from column 24 may be passed through line 27 into line 32 containing valve 33 and into treater 34 wherein any residual hydrogen chloride is removed. The treated material may then be passed into line 35 containing valve 36 into line 27 and fractionator 29. The isobutane is withdrawn from fractionator 29 through line 30 containing valve 31 and is cooled, condensed, and collected as a product of the reaction. The normal butane is withdrawn through line 37 and is recycled to the reactor through line 38. In an alternative flow, the bottoms from column 29 may be withdrawn through line 37 passed through line 39 containing valve 40 and into line 41 and fractionator 42.

To prevent a buildup of higher boiling hydrocarbons in the system, a stream of vaporous hydrocarbons having a low concentration of aluminum chloride therein is withdrawn from fractionator 16 through line 43 containing valve 44 and passed into treater 34 to remove aluminum chloride. The removal of aluminum chloride may be effected by treating the hydrocarbon stream with caustic or with a strong relatively non-volatile mineral acid, such as sulfuric acid or phosphoric acid. It frequently is desirable to partially or completely condense the vapor stream before sending it to the treater. If so desired, this stream may be cooled to the extent that aluminum chloride is deposited on the surface of the cooler. The stream may then be switched to another cooler and the deposited aluminum chloride redissolved in fresh charge or in one of the recycle streams. The treated hydrocarbons may be passed either through lines 35 and 27 into fractionator 29 or through line 41 containing valve 45 into fractionator 42. In fractionator 42 an overhead product comprising normal butane is separated from a bottoms product comprising pentanes and higher boiling hydrocarbons. The bottoms from fractionator 42 are withdrawn through line 46 containing valve 47, cooled and sent to storage. The overhead product from fractionator 42 is passed through line 48 into condenser 49 and receiver 50. Pump 51 takes suction on the condensed overhead product through line 52 containing valve 53. A portion of the overhead product is returned as reflux to the column through line 54 containing valve 55. The remainder is pumped through line 38 containing valve 58, through heater 56 to the reactor.

The following example is given to illustrate the results that can be obtained by the use of this invention but the example is not intended to limit the generally broad scope of the invention.

*Example*

In a butane isomerization unit of the type shown in the drawing, the hydrocarbon effluent from the reactor, exclusive of the aluminum chloride column bottoms recycle and the hydrogen chloride column recycle, had the following composition:

| Component | Liquid, Vol. Per Cent | Bbls. per Day |
|---|---|---|
| Propane | 0.8 | 23 |
| Isobutane | 41.0 | 1,140 |
| Normal Butane | 56.0 | 1,560 |
| Isopentane | 1.8 | 50 |
| Normal Pentane+ | 0.4 | 12 |

This material was part of the combined feed to the aluminum chloride column.

The aluminum chloride column was operated at a pressure of 225 pounds per square inch gage, a bottom temperature of 230° F., and a reflux ratio of 1, based on the net overhead. The liquid bottoms from this column had the following composition:

| Component | Liquid, Vol. Per Cent |
|---|---|
| Isobutane | 10 |
| Normal Butane | 70 |
| Isopentane | 16 |
| Normal Pentane+ | 4 |
| Aluminum Chloride, pounds/barrel | 3.0 |

To prevent a buildup of pentane and higher boiling hydrocarbons in the system it can be seen that it is necessary to withdraw 62 barrels per day of $C_5+$ from the system. To accomplish this $62 \div .20 = 310$ barrels per day of liquid aluminum chloride column bottoms would have to be removed. The amount of aluminum chloride lost in this stream would be $310 \times 3.0 = 930$ pounds per day. By the use of accepted equilibrium vaporization constants it can be shown that 508 barrels per day of vapor in equilibrium with the aluminum chloride column bottoms liquid would have to be withdrawn to remove 62 barrels per day of $C_5+$ from the system. I have determined that the equilibrium vaporization constant for aluminum chloride in this system is .05. Consequently, the vapor would contain .15 pound per barrel of aluminum chloride. Hence, the amount withdrawn with 508 barrels of the vapor would be 76 pounds per day. Thus, it can be seen that the use of my invention saves 930—76=854 pounds per day of aluminum chloride. There is also a savings amounting to 769 pounds per day in the quantity of sodium hydroxide required to neutralize the aluminum chloride. At the current price of $0.10 per pound for aluminum chloride and $0.025 per pound for sodium hydroxide, the total daily savings is thus in excess of $100.00, or approximately $0.10 per barrel of isobutane produced.

I claim as my invention:

1. In the catalytic isomerization of saturated hydrocarbons wherein the hydrocarbon is subjected to the action of a metal halide isomerizing catalyst in the presence of a hydrogen halide under isomerizing conditions and wherein sludge formed in the reaction is separated from the remaining reaction products, said saturated hydrocarbon being more volatile than said catalyst, the improvement which comprises introducing said remaining reaction products to a fractional distillation zone and therein fractionally distilling said products to separate an overhead product containing isomerized hydrocarbons formed in the reaction and the hydrogen halide from a liquid bottoms product containing dissolved metal halide, returning at least a portion of said bottoms product to the isomerization step, withdrawing from the fractional distillation zone at a point below that at which said remaining products are introduced, a vapor stream of hydrocarbons lower in metal halide concentration than the liquid in equilibrium therewith and comprising hydrocarbons higher boiling than said saturated hydrocarbon, and recovering said vapor stream.

2. The process of claim 1 further characterized in that said metal halide comprises aluminum chloride, and said hydrogen halide comprises hydrogen chloride.

3. In the catalytic isomerization of saturated hydrocarbons wherein the hydrocarbon is subjected to the action of a metal halide isomerizing catalyst in the presence of a hydrogen halide under isomerizing conditions and wherein sludge formed in the reaction is separated from the remaining reaction products, said saturated hydrocarbon being more volatile than said catalyst, the improvement which comprises introducing said remaining reaction products to a fractional distillation zone and therein fractionally distilling said products to separate an overhead product containing isomerized hydrocarbons formed in the reaction and the hydrogen halide from a liquid bottoms product containing dissolved metal halide, returning at least a portion of said bottoms product to the isomerization step, withdrawing from the fractional distillation zone at a point below that at which said remaining products are introduced, a vapor stream of hydrocarbons lower in metal halide concentration than the liquid in equilibrium therewith and comprising hydrocarbons higher boiling than said saturated hydrocarbon, and removing the metal halide from said vapor stream in a treating zone prior to subsequent fractionation.

4. The process of claim 3 further characterized in that said metal halide comprises aluminum chloride, and said hydrogen halide comprises hydrogen chloride.

5. In the catalytic isomerization of saturated hydrocarbons wherein the hydrocarbon is subjected to the action of a metal halide isomerizing catalyst in the presence of a hydrogen halide under isomerizing conditions and wherein sludge formed in the reaction is separated from the remaining reaction products, said saturated hydrocarbon being more volatile than said catalyst, the improvement which comprises introducing said remaining reaction products to a fractional distillation zone and therein fractionally distilling said products to separate an overhead product containing isomerized hydrocarbons formed in the reaction and the hydrogen halide from a liquid bottoms products containing dissolved metal halide, returning at least a portion of said bottoms product to the isomerization step, withdrawing from the fractional distillation zone at a point below that at which said remaining products are introduced, a vapor stream of hydrocarbons lower in metal halide concentration than the liquid in equilibrium therewith and comprising hydrocarbons higher boiling than said saturated hydrocarbon, and removing the metal halide from said vapor stream by caustic washing prior to subsequent fractionation.

6. The process of claim 5 further characterized in that said metal halide comprises aluminum chloride, and said hydrogen halide comprises hydrogen chloride.

7. The process of claim 5 further characterized in that part of the heat content of said vapor stream is removed prior to caustic washing and subsequent fractionation.

8. In the catalytic isomerization of saturated hydrocarbons wherein the hydrocarbon is subjected to the action of a metal halide isomerizing catalyst in the presence of hydrogen halide under isomerizing conditions and wherein sludge formed in the reaction is separated from the remaining reaction products, said saturated hydrocarbon being more volatile than said catalyst, the improvement which comprises fractionating said remaining reaction products under conditions to separate an overhead product containing isomerized hydrocarbons and hydrogen halide from a hydrocarbon liquid containing the metal halide in solution, returning at least a portion of the last named liquid to the reaction zone, fractionating said overhead product in a second fractionating zone to separate an overhead product containing most of the hydrogen halide from a substantially hydrogen halide-free bottoms product, supplying the last named overhead product to the reaction zone, and commingling the last named bottoms product with a vapor stream withdrawn from a point below the feed inlet in the first fractionating zone and comprising hydrocarbons higher boiling than said saturated hydrocarbon and subjecting the commingled streams to caustic washing prior to subsequent fractionation.

9. A hydrocarbon conversion process which comprises isomerizing a paraffinic hydrocarbon in the presence of an aluminum halide catalyst, thereby forming a reaction mixture containing isomerized paraffin and aluminum halide, said paraffinic hydrocarbon being more volatile than said catalyst, introducing said mixture to a fractionating zone and therein fractionating the same to separate an overhead product containing the isomerized paraffin from a liquid bottoms product containing heavier hydrocarbons and dissolved aluminum halide, returning at least a portion of said bottoms product to the isomerizing step, withdrawing a vaporous stream comprising hydrocarbons higher boiling than said paraffinic hydrocarbon from the fractionating zone at a point below the point of introduction of said mixture and from a region of said zone wherein a vapor phase of hydrocarbons and aluminum halide is in equilibrium with hydrocarbon liquid containing dissolved aluminum halide, whereby the withdrawn vaporous stream is of lower aluminum halide concentration than said liquid bottoms product, and preventing the return to the isomerizing step of the heavier hydrocarbons contained in said stream.

10. A hydrocarbon conversion process which comprises isomerizing normal butane in the presence of aluminum chloride, thereby forming a reaction mixture containing isobutane and aluminum chloride, introducing said mixture to a fractionating zone and therein fractioning the same to separate an overhead product containing the isobutane from a liquid bottoms product containing heavier hydrocarbons and dissolved aluminum chloride, returning at least a portion of said bottoms product to the isomerizing step, withdrawing a vaporous stream comprising hydrocarbons of at least 5 carbon atoms per molecule from the fractionating zone at a point below the point of introduction of said mixture and from a region of said zone wherein a vapor phase of hydrocarbons and aluminum chloride is in equilibrium with hydrocarbon liquid containing dissolved aluminum chloride, whereby the withdrawn vaporous stream is of lower aluminum chloride concentration than said liquid bottoms product, and preventing the return to the isomerizing step of said hydrocarbons of at least 5 carbon atoms per molecule contained in the vaporous stream withdrawn from the fractionating zone.

ROBERT E. SUTHERLAND.

REFERENCES CITED

The following references are of record in the file of this patent:

UNITED STATES PATENTS

| Number | Name | Date |
| --- | --- | --- |
| 2,266,011 | d'Ouville et al. | Dec. 16, 1941 |
| 2,266,012 | d'Ouville et al. | Dec. 16, 1941 |
| 2,343,406 | Dryer | Mar. 7, 1944 |
| 2,366,117 | Leonard | Dec. 26, 1944 |
| 2,378,728 | Roach | June 19, 1945 |
| 2,397,224 | Walsh, Jr., et al. | Mar. 26, 1946 |
| 2,402,818 | Iverson | June 25, 1946 |